United States Patent [19]
Tiedge

[11] Patent Number: 5,560,444
[45] Date of Patent: Oct. 1, 1996

[54] EXPANDABLE TRAILER HAVING A POSITION LOCKING FEATURE

[75] Inventor: Robert L. Tiedge, Cicero, Ind.

[73] Assignee: Hydra-Slide Corporation, Indianapolis, Ind.

[21] Appl. No.: 497,276

[22] Filed: Jun. 30, 1995

[51] Int. Cl.⁶ .................................................. B62D 61/12
[52] U.S. Cl. ........................... 180/209; 296/26; 280/656
[58] Field of Search ........................... 296/26, 171, 175; 180/209; 280/400, 656, 638

[56] References Cited

U.S. PATENT DOCUMENTS

| | | | |
|---|---|---|---|
| 3,740,088 | 6/1973 | Ratcliff | 296/171 |
| 4,299,421 | 11/1981 | Bontrager | 296/171 X |
| 4,488,752 | 12/1984 | Broussard | 296/171 |
| 5,249,823 | 10/1993 | McCoy et al. | 280/656 |
| 5,445,236 | 8/1995 | Kuhn | 180/209 X |

Primary Examiner—Christopher P. Ellis
Attorney, Agent, or Firm—Woodard, Emhardt, Naughton Moriarty & McNett

[57] ABSTRACT

A position locking feature for an expandable trailer by which the trailer may be automatically locked in either an expanded or a retracted position. A stop block having a transverse striking plate is mounted to an expansion box beam carrying the expandable portion of the trailer. A locking assembly is mounted to a fixed box beam carrying the fixed portion of the trailer. The locking assembly biases a plunger toward the expansion box beam such that the plunger abuts the transverse striking plate, thereby preventing relative movement of the fixed and expandable portions in one direction. A pair of such stop blocks may be used to lock the trailer in either of the expanded or retracted positions.

25 Claims, 7 Drawing Sheets

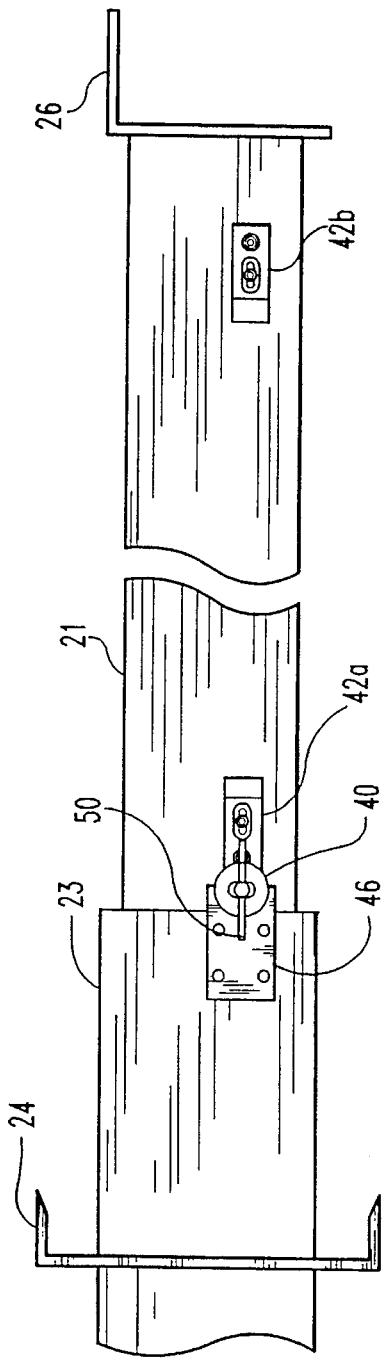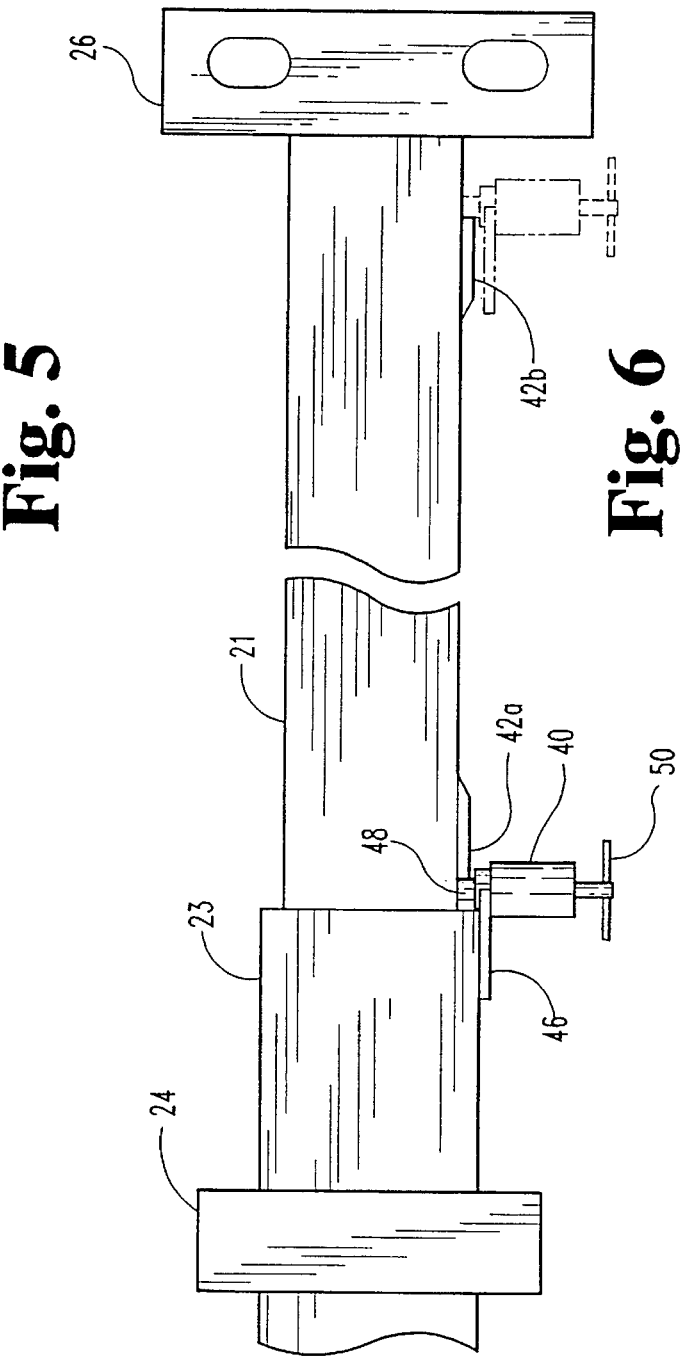

Very Small Striking Area

Relatively Large Force Transmission Surfaces

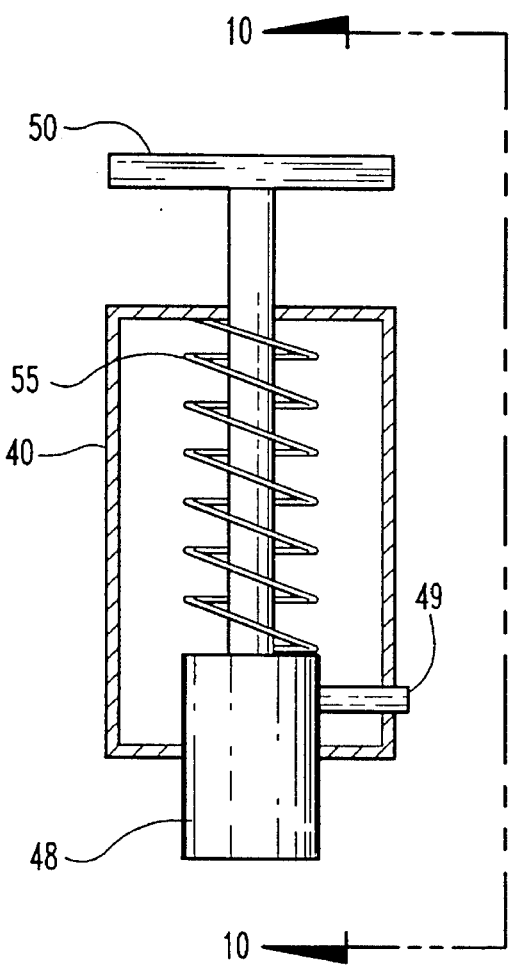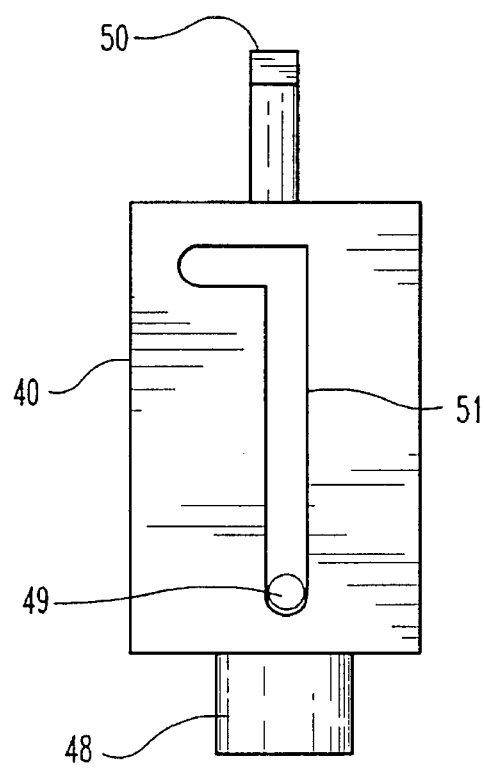
Fig. 9     Fig. 10

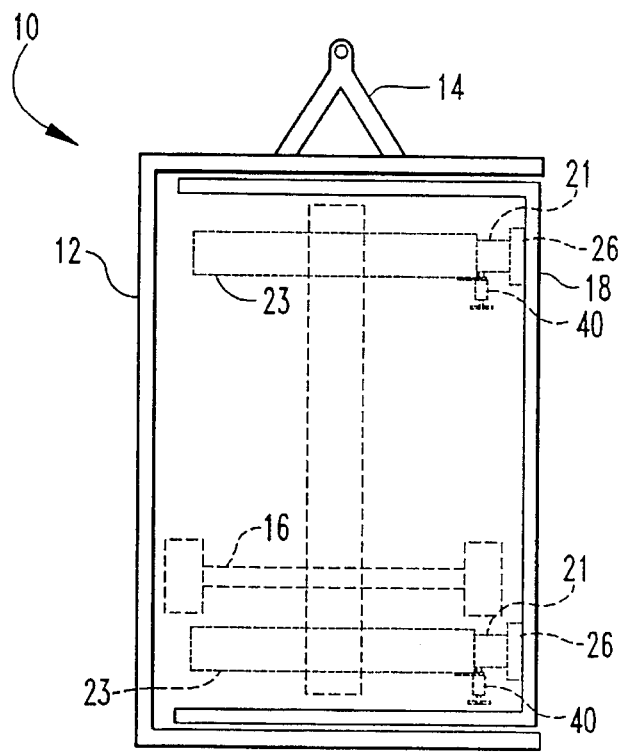
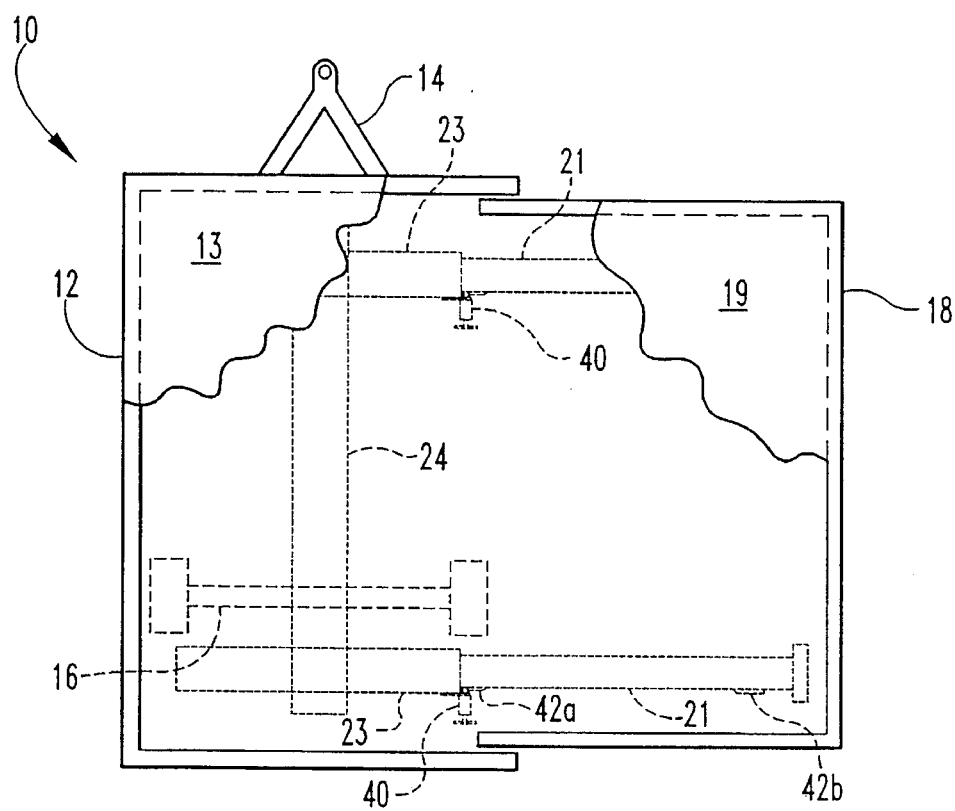
Fig. 11
Fig. 12

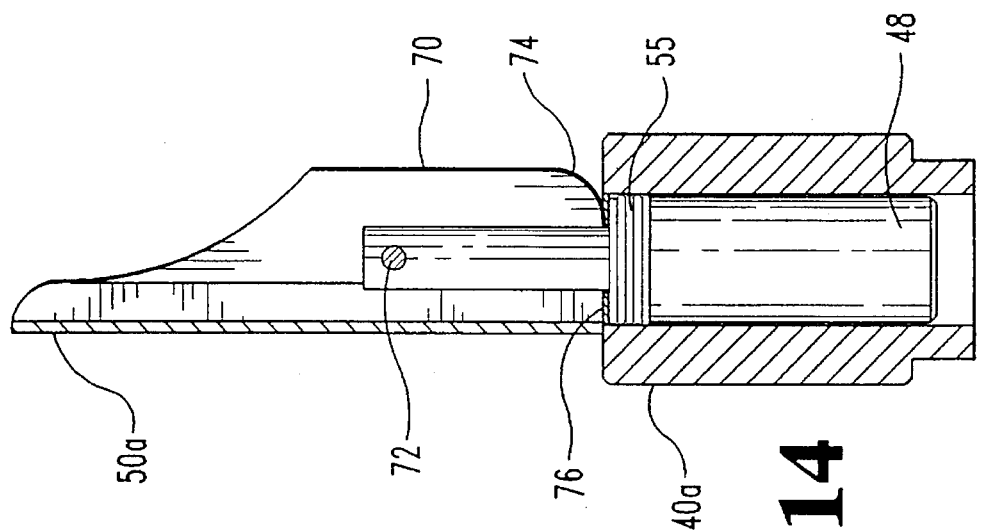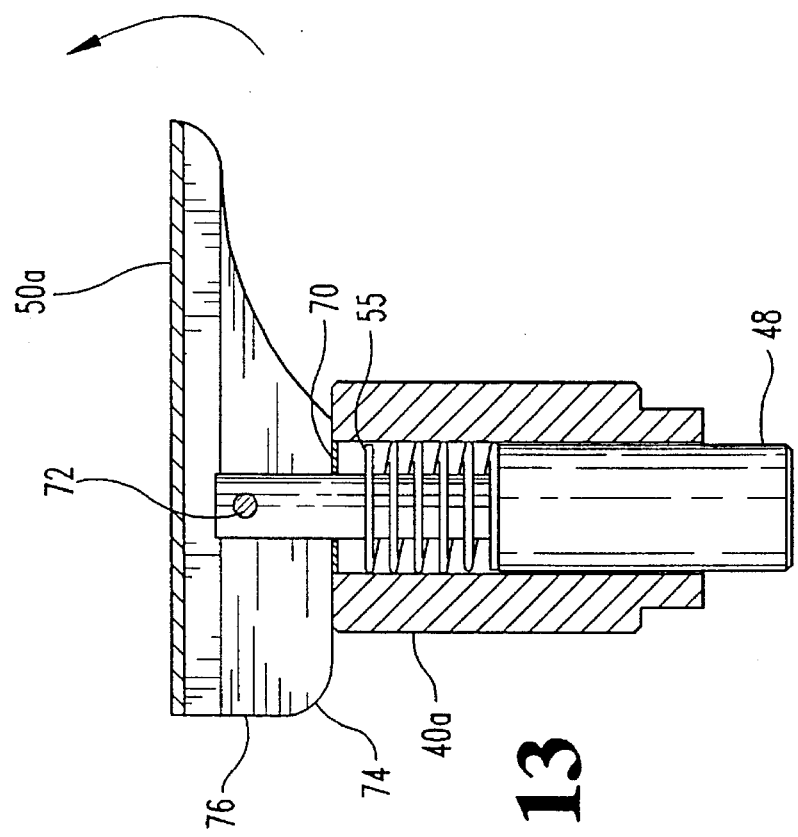

EXPANDABLE TRAILER HAVING A POSITION LOCKING FEATURE

TECHNICAL FIELD OF THE INVENTION

The present invention generally relates to expandable trailers, and more particularly to an expandable trailer having a position locking feature.

BACKGROUND OF THE INVENTION

Recreational vehicles enjoy widespread popularity because they enable their owners to travel away from home for extended periods while enjoying many of the comforts of home. One present limitation of such recreational vehicles is that their interior spaces are somewhat small and cramped compared to a normal living space. While many factors contribute to this design limitation, the major contributor is the relatively narrow width of the normal street or highway. The need to travel within the confines of a normal highway traffic lane sets an upper limit on the feasible width of a recreational vehicle. Because this upper width limit is much smaller than the width of even a small room in a normal house, the interior of the recreational vehicle seems cramped by familiar comparison.

One ingenious solution to this problem is the hydraulically actuated expandable room which may be incorporated into a recreational vehicle such as a motor home or a travel trailer. The expandable room forms the interior space of the recreational vehicle in two telescoping sections. As shown schematically in FIG. 1 of the accompanying drawings, a trailer 10 includes a fixed portion 12 which is fixedly attached to a trailer frame 14, as is trailer axle 16. The trailer 10 further includes an expandable portion 18 which is slidingly engaged with the trailer frame 14 and configured so as to move in telescoping engagement with the fixed portion 12. The trailer 10 is illustrated in its retracted position in FIG. 1, in which the expandable portion 18 is telescopically nested within the fixed portion 12. In this retracted position, the trailer 10 is sufficiently narrow to travel within the confines of a normal highway traffic lane.

Referring now to FIG. 2, when the trailer 10 has been parked and is no longer restricted to the width of a normal highway traffic lane, expandable portion 18 may be telescopic, ally un-nested from fixed portion 12, such that the interior volume of the trailer 10 is substantially greater, approaching double the volume of the trailer 10 in its retracted position. Movement of the expandable portion 18 out of and into the fixed portion 12 is normally facilitated by a plurality of hydraulic cylinders (not shown) each having one end coupled to the fixed portion 12 and another end coupled to the expandable portion 18. Fixed portion 12 includes an integral roof 13 and expandable portion 18 includes an integral roof 19. The trailer 10 is therefore enclosed whether it is in its retracted or expanded position.

Fixed portion 12 and expandable portion 18 are supported in sliding engagement by a plurality of telescoping beams. Referring to FIG. 3, an example of such sliding engagement is provided by an expansion box beam 20 which slides in telescopic arrangement with fixed box beam 22. The desired spacing between the box beams 20 and 22 is maintained by a plurality of nylon shims (not shown) mounted on the interior surface of fixed box beam 22. Fixed box beam 22 is fixedly attached to a chassis mainrail 24 of the trailer frame 14. Fixed portion 12 is also coupled to the chassis mainrail 24. The distal end of expansion box beam 20 includes a mounting flange 26. The expandable portion 18 is fixedly attached to the mounting flange 26. When the hydraulic cylinders operate to cause relative motion between the fixed portion 12 and the expandable portion 18, telescopic movement of the box beams 20 and 22 occurs.

When the trailer 10 is in a retracted position, it is important to insure that the trailer is not inadvertently expanded. Likewise, when the trailer 10 is in an expanded position, it is important to insure that the trailer is not inadvertently retracted. For this reason, fixed box beam 22 includes a hole 28 drilled therethrough, while expansion box beam 20 includes holes 30 and 32 drilled therethrough. The holes 28–32 are positioned such that the holes 28 and 30 align when the trailer is expanded, and the holes 28 and 32 align when the trailer is retracted. Once the trailer has been moved to either position, a pin 34 (see FIG. 4) is placed through the two aligned holes, thereby preventing further relative movement of the fixed portion 12 and the expandable portion 18.

Such a locking arrangement, however, exhibits several problems in practice. First, it is difficult to align the two holes during hydraulic movement of the expandable portion 18. If the two holes are not aligned, the pin 34 cannot be inserted therethrough. Furthermore, such trailers have a tendency to warp over time, contributing to the difficulty in aligning the holes. An attempt has been made in the prior art to solve this problem by making the holes 30 and 32 larger than the hole 28, thereby eliminating the need for exact alignment. Drilling large holes in the expansion box beam 20, however, is undesirable. The larger the holes 30 and 32, the greater the compromise to the structural integrity of the expansion box beam 20.

A further problem encountered by the use of large holes 30 and 32 is illustrated in FIG. 4. When the locking pin 34 is engaged through the hole 30, 32, and there is relative movement between the fixed box beam 22 and the expansion box beam 20, the pin 34 strikes the hole 30, 32 at a very small area, resulting in a very large force per unit area transferred to the expansion box beam 20. Because the box beam. 20 is normally made from a relatively soft metal, severe deformation of the hole 30, 32 can occur over time, causing improper alignment of the fixed portion 12 to the, expandable portion 18, and further weakening the box beam 20.

There is therefore a need in the prior art for a device that will lock the fixed and expansion box beams at desired locations without exhibiting the problems of the prior art locking mechanisms. The present invention is directed toward meeting this need.

SUMMARY OF THE INVENTION

The present invention relates to a position locking feature for an expandable trailer by which the trailer may be automatically locked in either an expanded or a retracted position. A stop block having a transverse striking plate is mounted to an expansion box beam carrying the expandable portion of the trailer. A locking assembly is mounted to a fixed box beam carrying the fixed portion of the trailer. The locking assembly biases a plunger toward the expansion box beam such that the plunger abuts the transverse striking plate, thereby preventing relative movement of the fixed and expandable portions in one direction. A pair of such stop blocks may be used to lock the trailer in either of the expanded or retracted positions.

In one form of the invention, an expandable trailer having a position locking feature is disclosed, comprising a fixed portion; an expandable portion; a first telescoping member coupled to one of said fixed portion or expandable portion; a second telescoping member coupled to the other of said fixed portion or expandable portion, wherein the first and second telescoping members are operable to move in telescopic engagement to assist in expanding the expandable portion; a locking member coupled to the first telescoping member; and a stop block coupled to the second telescoping member, the stop block including a transverse surface extending external to the second telescoping member; wherein at a suitable expansion position during telescopic movement of the first and second telescoping members, the locking member abuts the transverse surface of the stop block and thereby prevents telescopic movement in a first direction.

In another form of the invention, an expandable trailer having a position locking feature is disclosed, comprising a fixed portion; an expandable portion; a first telescoping member coupled to one of said fixed portion or expandable portion; a second telescoping member coupled to the other of said fixed portion or expandable portion, whereto the first and second telescoping members are operable to move in telescopic engagement to assist in expanding the expandable portion; a locking assembly coupled to the first telescoping member and including a plunger biased toward the second telescoping member; a stop block coupled to the second telescoping member, the stop block including a transverse surface extending external to the second telescoping member and a camming surface extending external to the second telescoping member; wherein the camming surface is operative to deflect the plunger away from the second telescoping member during telescopic movement of the first and second telescoping members; and wherein at a suitable expansion position during telescopic movement of the first and second telescoping members, the plunger abuts the transverse surface of the stop block and thereby prevents telescopic movement in a first direction.

In another form of the invention, an expandable trailer having a position locking feature is disclosed, comprising a fixed portion; an expandable portion; a first telescoping member coupled to one of said fixed portion or expandable portion; a second telescoping member coupled to the other of said fixed portion or expandable portion, wherein the first and second telescoping members are operable to move in telescopic engagement to assist in expanding the expandable portion; a locking assembly coupled to the first telescoping member and including a plunger biased toward the second telescoping member; a first stop block coupled to the second telescoping member, the first stop block including a first transverse surface extending external to the second telescoping member; a second stop block coupled to the second telescoping member, the second stop block including a second transverse surface extending external to the second telescoping member; wherein at an expanded position of the trailer, the plunger abuts the first transverse surface and thereby prevents telescopic movement in a retracting direction; and wherein at a retracted position of the trailer, the plunger abuts the second the transverse surface and thereby prevents telescopic movement in an expanding direction.

BRIEF DESCRIPTION OF THE DRAWINGS

FIG. 5 is an elevational view of a telescoping box beam assembly incorporating the position locking device of the present invention.

FIG. 6 is a plan view of the telescoping box beam assembly of FIG. 5.

FIG. 9 is a cut-away view of the locking assembly of the present invention.

FIG. 10 is an elevational view of the locking assembly of FIG. 9.

FIG. 11 is a schematic partial cross-sectional view of an expandable trailer incorporating the present invention in a retracted position.

FIG. 12 is a schematic partial cross-sectional view of an expandable trailer incorporating the present invention in an expanded position.

FIG. 13 is a cut-away view of a second embodiment locking assembly of the present invention in an extended position.

FIG. 14 is a cut-away view of the second embodiment locking assembly of FIG. 13 in a retracted position.

DESCRIPTION OF THE PREFERRED EMBODIMENT

Figure 1:
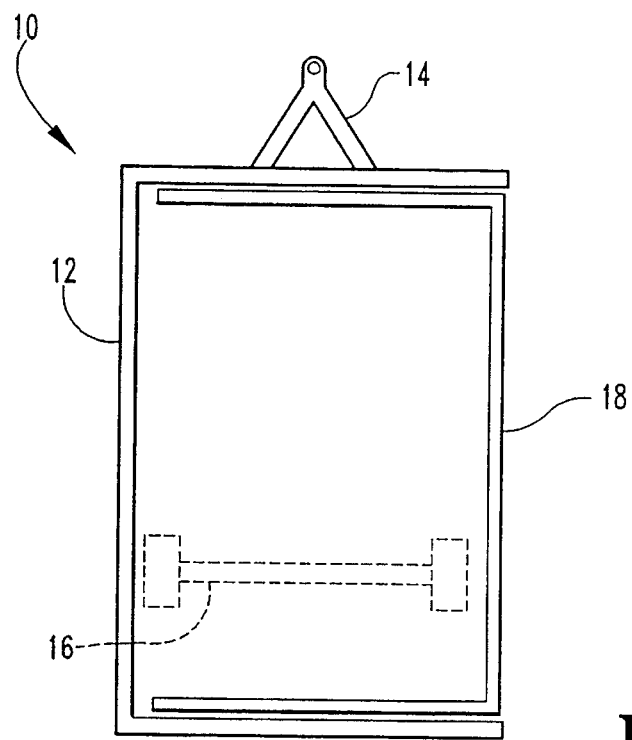
FIG. 1 is a schematic partial cross-sectional view of a prior art expandable trailer in the retracted position.
Figure 2:
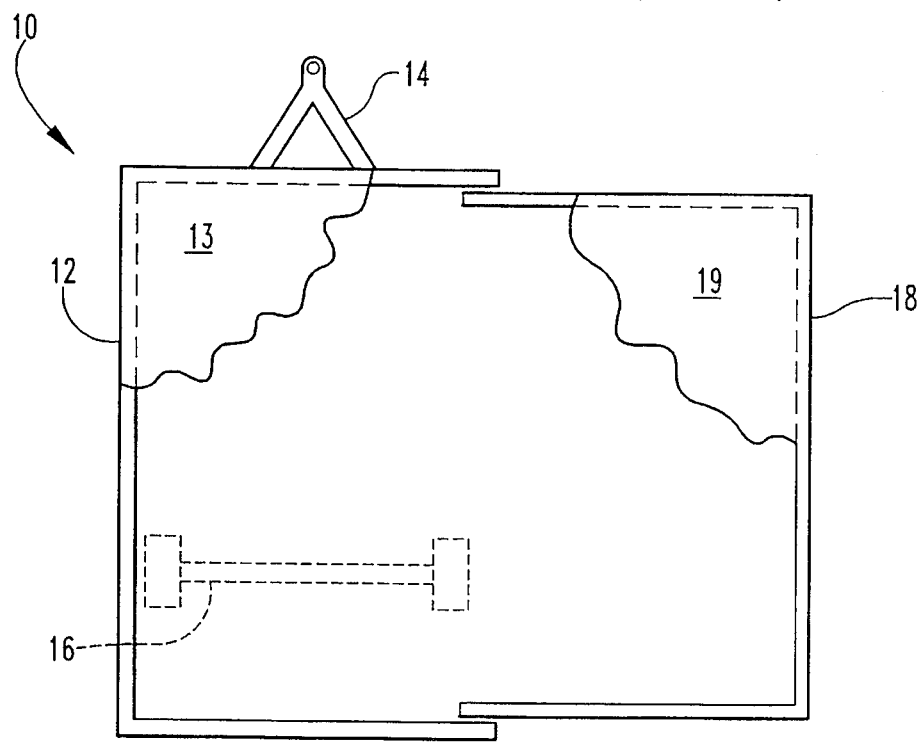
FIG. 2 is a schematic partial cross-sectional view of the trailer of FIG. 1 in an expanded position.
Figure 3:
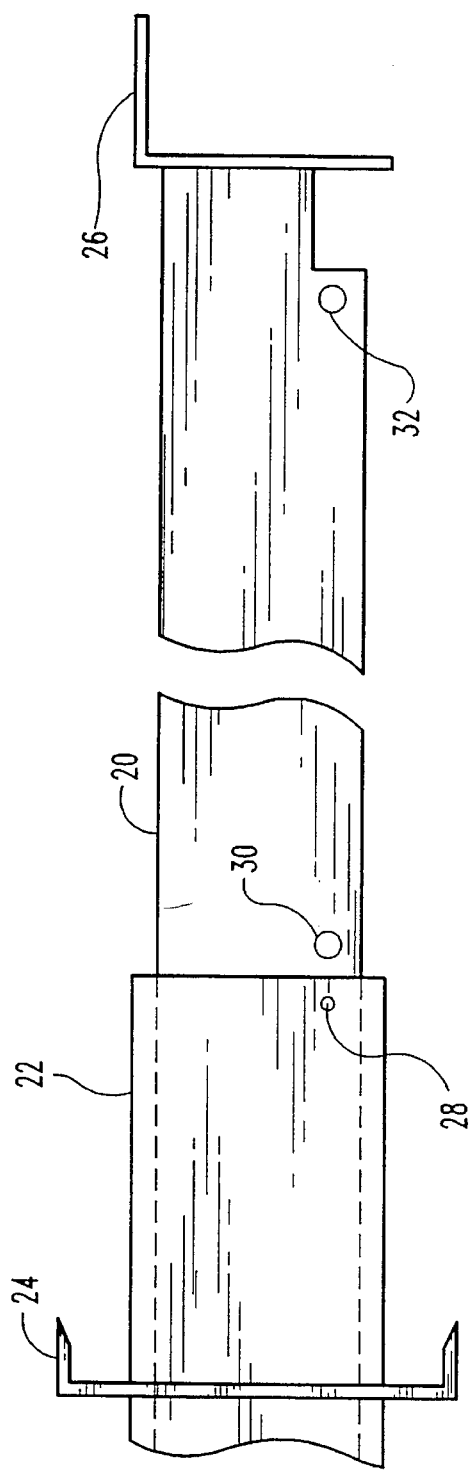
FIG. 3 is an elevational view of a prior art telescoping box beam assembly.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 5 and 6, there is illustrated a position locking device of the present invention mounted on telescoping box beams 21 and 23. The position locking feature of the present invention includes two separate portions: a locking assembly 40 and a pair of stop blocks 42a and 42b. The locking assembly 40 is fixedly attached to the fixed box beam 23 by means of a mounting flange 46. Locking assembly 40 includes a plunger 48 which is made of a relatively hard metal, such as stainless steel. Plunger 48 is coupled to a plunger T-handle 50. The illustration of the locking assembly in phantom in FIG. 6 is intended only to show how it engages stop block 42b. It is the stop block which moves, not the locking assembly 40.

Figure 7:
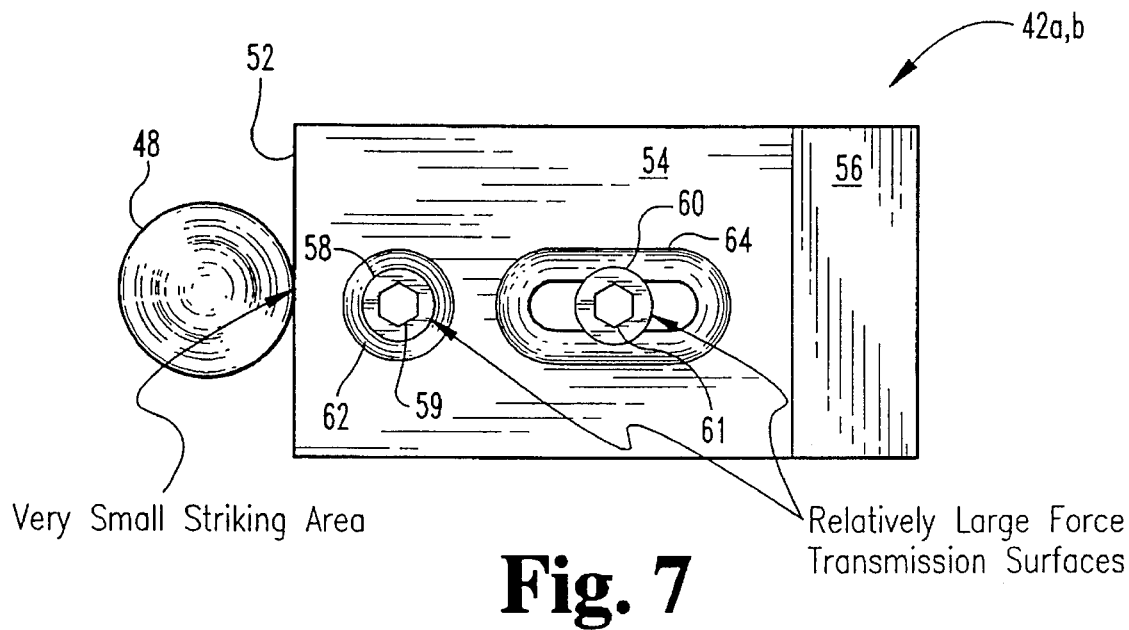
FIG. 7 is an enlarged elevational view of a first embodiment position locking device of the present invention.
Figure 8:
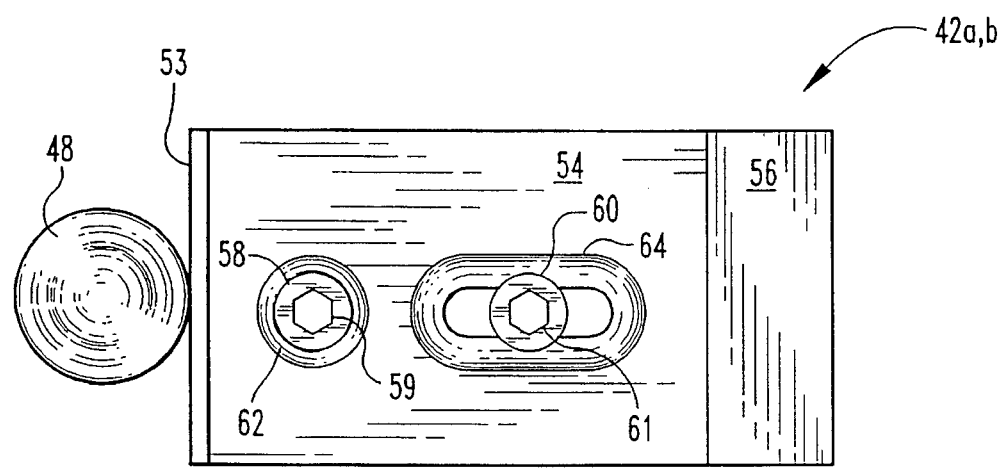
FIG. 8 is an elevational view of a second embodiment position looking device of the present invention.

The configuration of the stop blocks 42a and 42b is illustrated in greater detail in FIG. 7. Each stop block includes a transverse striking surface 52 which extends substantially perpendicularly from the surface of expansion box beam 21. When the trailer is locked in either a retracted or expanded position, the plunger 48 of locking assembly 40 engages the transverse striking surface 52 of the stop block 42. Because almost all of the longitudinal sliding force between fixed box beam 23 and expansion box beam 21 is transmitted from the plunger 48 to the transverse striking surface 52, it is preferable that the stop block be made from a relatively hard metal, such as stainless steel. Alternatively, as shown in FIG. 8, a separate transverse striking plate 53 made from such a harder metal may be attached to a stop block 42 made from a relatively softer metal. For example, the striking plate 53 may be formed from stainless steel and attached to the end of an aluminum stop block 42. Alternatively, the striking surface 52 may be formed by case hardening the end of stop block 52. Stop block 42 further includes longitudinal surface 54 and sloping camming surface 56. The longitudinal surface 54 is substantially parallel to the surface of the expansion box beam 21, while the camming surface 56 extends from the longitudinal surface 54 to the surface of expansion box beam 21 in a ramp configuration. The stop block 42 is mounted to the surface of the expansion box beam 21 by means of two screws 58 and 60. The screws 58 and 60 are threadingly engaged with tapped holes in the surface of expansion box beam 21. The screw 58 is mounted within a countersunk hole 62 in the stop block 42, and the screw 60 is mounted within a countersunk hole 64, such that the heads of the screws 58 and 60 do not extend above the longitudinal surface 54. Additionally, the countersunk hole 64 is in a race track configuration in order to allow for adjustment of the stop block 42, as will be explained hereinbelow. Screws 58 and 60 include respective tool receivers 59 and 61 in any convenient configuration, such as hex or torx.

Figure 4:
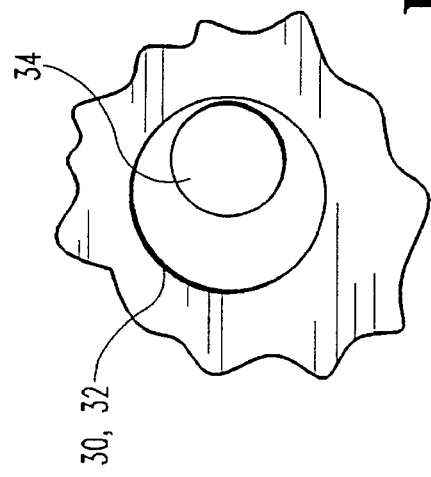
FIG. 4 is a schematic illustration of a prior art locking pin and alignment hole.

The point of contact between plunger 48 and transverse striking surface 52 comprises a very small striking area, as was the case with the prior art locking pin of FIG. 4. However, the plunger 48 and transverse striking surface 52 are constructed of a relatively hard metal, which does not substantially deform after repeated strikings. The present invention is an improvement over the prior art arrangement because force is transmitted to the expansion box beam 21 through the screws 58 and 60 which couple the stop block 42 to the box beam 21. The screws 58 and 60 fit tightly into the threaded holes in the box beam 21, therefore the transmitted force is spread over the relatively large surface where the screws 58 and 60 contact the expansion box beam 21. This substantially reduces the force per unit area transmitted to the expansion box beam 21, which can consequently be made of a relatively soft metal without the possibility of deformation.

Referring once again to FIG. 6, operation of the position locking device of the present invention will now be explained. The box beams 21 and 23 are illustrated in their expanded position in the drawing of FIG. 6. The locking assembly 40 includes a biasing mechanism, such as a spring, which urges the plunger 48 against the surface of the expansion box beam 21. In the expanded position illustrated in FIG. 6, the expansion box beam 21 cannot be retracted into the fixed box beam 23 because of the engagement of the plunger 48 with the transverse striking surface 52 of stop block 42*a*. In this position, the trailer is securely maintained in an expanded position. In order to retract the trailer, the position locking device of the present invention must be disengaged. The plunger 48 is disengaged from the stop block 42*a* by pulling the T-handle 50 away from the expansion box beam 21, thereby compressing the spring within the plunger assembly 40. As illustrated in FIGS. 9 and 10, the locking assembly 40 is designed so that the plunger 48 may be held in a retracted position by turning the T-handle 50 through a one-quarter revolution. The plunger 48 is coupled to a pin 49 which protrudes through an L-shaped slot 51 in the locking assembly 40. A spring 55 biases the plunger in an extended direction, however the engagement of the pin 49 with the slot 51 prevents extension until the T-handle 50 is rotated one-quarter turn.

Once the plunger 48 has been retracted from the area of the transverse striking surface 52 of the stop block 42*a*, the hydraulic cylinders of the trailer may be operated to retract the expansion box beam 21 into the fixed box beam 23. Once the transverse striking surface 52 has moved beneath the plunger 48, the T-handle 50 of the locking assembly 40 may be rotated to its original position, thereby allowing the biasing spring 55 to urge the plunger 48 toward the expansion box beam 21. In this position, the plunger 48 will contact the longitudinal surface 54 of the stop block 42*a*. As the expansion box beam 21 continues to slide into the fixed box beam 23, the stop block 42*a* will slide underneath the plunger 48. Such sliding movement is made possible by plunger 48 having a diameter which is greater than the diameter of countersunk holes 62 and 64. When the camming surface 56 of the stop block 42*a* slides beneath the plunger 48, the bias spring 55 within the locking assembly 40 maintains the plunger 48 in contact with the camming surface 56 until the stop block 42*a* passes from beneath the locking assembly 40, at which time the plunger 48 will be engaged with the surface of the expansion box beam 21.

Once the expansion box beam 21 nears its fully retracted position, the plunger 48 of the locking assembly 40 will engage the leading edge of the camming surface 56 of stop block 42*b*. Further movement of the expansion box beam 21 toward its retracted position results in the camming surface 56 of the stop block 42*b* urging the plunger 48 into the locking assembly 40, thereby compressing the bias spring 55. The plunger 48 will then slide along the longitudinal surface 54 of the stop block 42*b* until the transverse striking surface 52 of the stop block 42*b* passes from beneath the locking assembly 40. At this point, the bias spring 55 within the locking assembly 40 will urge the plunger 48 into contact with the expansion box beam 21. This occurs when the expansion box beam 21 is fully retracted within the fixed box beam 23. At this point, the plunger 48 is engaged with the transverse striking surface 52 of the stop block 42*b*, therefore the expansion box beam 21 cannot thereafter be removed from the fixed box beam 23 until the plunger 48 is moved out of the way by operation of the T-handle 50.

It will be appreciated by those skilled in the art that the countersunk holes 62 and 64 allow the plunger 48 to slide across the longitudinal surface 54 of the stop blocks 42 without interference from the heads of the screws 58 and 60. It will be further appreciated by those skilled in the art that the locking assembly 40 in conjunction with the stop blocks 42*a* and 42*b* allow for automatic locking the expandable trailer in either its expanded or retracted position, without the need to align two transverse holes as in the prior art devices.

A further advantage of the present invention occurs because of the race track shape of the countersunk hole 64. If the expandable trailer should warp over time, such that the location of the transverse striking surface 52 on one of the stop blocks 42 is no longer in the desired location for locking the trailer, only the hole for the screw 58 needs to be redrilled through the expansion box beam 21, because the longitudinal countersunk slot 64 of the stop block 42 allows the screw 60 to remain in its original hole when the stop block 42 is moved to the left or to the right. This feature reduces the number of holes that must be drilled into the expansion box beam 21 when adjustment of the locking position is required.

Referring now to FIGS. 11 and 12, the expandable box beams 21 and 23 incorporating the position locking feature of the present invention are shown mounted to an expandable trailer. The trailer is shown in its retracted position in FIG. 11 and in its expanded position in FIG. 12.

Referring to FIGS. 13 and 14, there is illustrated an alternative embodiment to the locking assembly 40, the second embodiment being indicated generally at 40a. Like the locking assembly 40, the locking assembly 40a includes a plunger 48 and a bias spring 55. The locking assembly 40a further includes a handle 50a which is coupled to the top end of the plunger 48. In an extended position of the locking assembly 40a, the side 70 of the handle 50a rests against the top of the housing of the locking assembly 40a. In order to place the locking assembly 40a into the retracted position, the handle 50a is pulled in an upward direction (as indicated by the arrow in FIG. 13) so that the handle pivots about the coupling 72. The pivoting about the coupling 72 causes the curved surface 74 of the handle 50a to slide upon the top of the housing of the locking assembly 40a until the side 76 of the handle 50a comes to rest on the top of the housing. This retracted position is illustrated in FIG. 14. The sequence is reversed in order to return the locking assembly 40a to the extended position illustrated in FIG. 13. It will be appreciated by those skilled in the art that numerous other designs for the locking assembly will suffice to produce extended and retracted positioning of the plunger 48. The present invention is intended to encompass all such designs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An expandable trailer having a position locking feature, comprising:

a fixed portion;

an expandable portion;

a first telescoping member coupled to one of said fixed portion or expandable portion;

a second telescoping member coupled to the other of said fixed portion or expandable portion, wherein the first and second telescoping members are operable to move in telescopic engagement to assist in expanding the expandable portion;

a locking member coupled to the first telescoping member; and a stop block coupled to the second telescoping member, the stop block including a transverse surface extending external to the second telescoping member;

wherein at a suitable expansion position during telescopic movement of the first and second telescoping members, the locking member abuts the transverse surface of the stop block and thereby prevents telescopic movement in a first direction.

2. The expandable trailer of claim 1, wherein the transverse surface of the stop block is formed from a substantially harder material than the second telescoping member.

3. The expandable trailer of claim 2, wherein the transverse surface of the stop block is a separate member affirmed to the stop block.

4. The expandable trailer of claim 1, wherein the stop block further includes a camming surface operative to deflect the locking member away from the second telescoping member during said telescopic movement.

5. The expandable trailer of claim 1, wherein the locking member comprises a plunger that is biased toward the second telescoping member.

6. The expandable trailer of claim 1, wherein the stop block includes at least one countersunk hole for accepting a mounting screw therethrough, and wherein a first width of the locking member is greater than a second width of the at least one countersunk hole, such that the locking member may slide over the at least one countersunk hole without interference therefrom.

7. The expandable trailer of claim 1, wherein the trailer includes an enclosed expandable living compartment.

8. The expandable trailer of claim 1, wherein the first and second telescoping members are box beams.

9. The expandable trailer of claim 1, wherein the locking member is configured so that it may be manually retracted wherein it does not interfere with the transverse surface of the stop block.

10. An expandable trailer having a position locking feature, comprising:

a fixed portion;

an expandable portion;

a first telescoping member coupled to one of said fixed portion or expandable portion;

a second telescoping member coupled to the other of said fixed portion or expandable portion, wherein the first and second telescoping members are operable to move in telescopic engagement to assist in expanding the expandable portion;

a locking assembly coupled to the first telescoping member and including a plunger biased toward the second telescoping member;

a stop block coupled to the second telescoping member, the stop block including a transverse surface extending external to the second telescoping member and a camming surface extending external to the second telescoping member;

wherein the camming surface is operative to deflect the plunger away from the second telescoping member during telescopic movement of the first and second telescoping members; and wherein at a suitable expansion position during telescopic movement of the first and second telescoping members, the plunger abuts the transverse surface of the stop block and thereby prevents telescopic movement in a first direction.

11. The expandable trailer of claim 10, wherein the transverse surface of the stop block is formed from a substantially harder material that the second telescoping member.

12. The expandable trailer of claim 11, wherein the transverse surface of the stop block is a separate member affixed to the stop block.

13. The expandable trailer of claim 10, wherein the trailer includes an enclosed expandable living compartment.

14. The expandable trailer of claim 10, wherein the first and second telescoping members are box beams.

15. The expandable trailer of claim 10, wherein the plunger is configured so that it may be manually retracted wherein it does not interfere with the transverse surface of the stop block.

16. The expandable trailer of claim 10, wherein the stop block includes at least one countersunk hole for accepting a mounting screw therethrough, and wherein a first width of the plunger is greater than a second width of the at least one countersunk hole, such that the plunger may slide over the at least one countersunk hole without interference therefrom.

17. An expandable trailer having a position locking feature, comprising:

a fixed portion;

an expandable portion;

a first telescoping member coupled to one of said fixed portion or expandable portion;

a second telescoping member coupled to the other of said fixed portion or expandable portion, wherein the first and second telescoping members are operable to move in telescopic engagement to assist in expanding the expandable portion;

a locking assembly coupled to the first telescoping member and including a plunger biased toward the second telescoping member;

a first stop block coupled to the second telescoping member, the first stop block including a first transverse surface extending external to the second telescoping member;

a second stop block coupled to the second telescoping member, the second stop block including a second transverse surface extending external to the second telescoping member;

wherein at an expanded position of the trailer, the plunger abuts the first transverse surface and thereby prevents telescopic movement in a retracting direction; and wherein at a retracted position of the trailer, the plunger abuts the second transverse surface and thereby prevents telescopic movement in an expanding direction.

18. The expandable trailer of claim 17, wherein the first transverse surface faces away from the second transverse surface.

19. The expandable trailer of claim 17, wherein:

the first stop block includes a first camming surface operative to deflect the plunger away from the second telescoping member during telescopic movement in the expanding direction; and the second stop block includes a second camming surface operative to deflect the plunger away from the second telescoping member during telescopic movement in the retracting direction.

20. The expandable trailer of claim 17, wherein the first and second transverse surfaces are formed from a substantially harder material than the second telescoping member.

21. The expandable trailer of claim 17, wherein the transverse surface of the stop block is a separate member affixed to the stop block.

22. The expandable trailer of claim 17, wherein the trailer includes an enclosed expandable living compartment.

23. The expandable trailer of claim 17, wherein the first and second telescoping members are box beams.

24. The expandable trailer of claim 17, wherein the plunger is configured so that it may be manually retracted wherein it does not interfere with either the first or second transverse surfaces.

25. The expandable trailer of claim 17, wherein the stop block includes at least one countersunk hole for accepting a mounting screw therethrough, and wherein a first width of the plunger is greater than a second width of the at least one countersunk hole, such that the plunger may slide over the at least one countersunk hole without interference therefrom.

* * * * *

UNITED STATES PATENT AND TRADEMARK OFFICE
CERTIFICATE OF CORRECTION

PATENT NO.  : 5,560,444

DATED       : October 1, 1996

INVENTOR(S) : Robert L. Tiedge

It is certified that error appears in the above-identified patent and that said Letters Patent is hereby corrected as shown below:

In column 1, line 15, please change "present" to --persistent--.
In column 1, lines 44 and 45, please change "telescopic, ally" to
    --telescopically--.
In column 2, line 40, please delete the period after "beam".
In column 2, line 42, please delete the comma after "the".
In column 3, line 21, please change "whereto" to --wherein--.
In column 3, line 58, please delete "the" after "second".
In column 5, line 23, please delete the comma after "the".
In column 6, line 49, please insert --of-- after "locking".
In column 7, line 59, please change "affirmed" to --affixed--.

Signed and Sealed this

Fourth Day of March, 1997

Attest:

BRUCE LEHMAN

*Attesting Officer*   *Commissioner of Patents and Trademarks*